(12) United States Patent
Pavan (10) Patent No.: US 8,512,030 B2
(45) Date of Patent: Aug. 20, 2013

(54) BLOW-MOLDING MACHINE FOR THERMOPLASTIC PIECES AND CONTAINERS

(76) Inventor: Antonio Gumercindo Pavan, Americana/SP (BR)

( * ) Notice: Subject to any disclaimer, the term of this patent is extended or adjusted under 35 U.S.C. 154(b) by 299 days.

(21) Appl. No.: 12/406,142

(22) Filed: Mar. 18, 2009

(65) Prior Publication Data

US 2010/0239706 A1     Sep. 23, 2010

(51) Int. Cl.
*B29C 49/04*     (2006.01)
*B29C 49/32*     (2006.01)

(52) U.S. Cl.
USPC .......................................... 425/532; 425/538

(58) Field of Classification Search
USPC ................................................ 425/532, 538
See application file for complete search history.

(56) References Cited

U.S. PATENT DOCUMENTS

| | | | | |
|---|---|---|---|---|
| 3,640,661 A * | 2/1972 | Gasior et al. | ................... | 425/532 |
| 4,297,092 A * | 10/1981 | Goron | ............................ | 425/532 |
| 4,459,095 A * | 7/1984 | Rohr et al. | ..................... | 425/532 |
| 4,552,526 A * | 11/1985 | Hafele | ........................... | 425/532 |
| 4,770,624 A * | 9/1988 | Ziegler | ........................... | 425/532 |
| 4,859,170 A * | 8/1989 | Aoki | ............................... | 425/538 |
| 5,656,214 A * | 8/1997 | Uchiyama et al. | ............. | 425/532 |
| 5,695,792 A * | 12/1997 | Carr | ................................ | 425/532 |
| 5,976,452 A * | 11/1999 | Meyer | ............................ | 425/532 |
| 6,702,567 B2 * | 3/2004 | Johnson | ........................ | 425/532 |
| 2008/0157443 A1 * | 7/2008 | Hock | ............................. | 264/512 |

* cited by examiner

*Primary Examiner* — Robert B Davis
(74) *Attorney, Agent, or Firm* — Schmeiser, Olsen & Watts, LLP (57) ABSTRACT

The present invention relates to a blow-molding machine for thermoplastic pieces and containers, which is designed to work simultaneously with two or more molding lines, wherein said machine comprises an extrusion set (2), and a blow-molding set (3); said blow-molding set (3) is coupled to the extrusion set (2); said blow-molding set (3) is formed by an extrusion head (4), at least one blowing station (5), and at least one molding station (6). In addition to increase the productivity, the blow-molding machine disclosed herein also allows a slight increase in the diversity of finished products, provided that they are made from the same material (type of thermoplastic material) with similar dimensions. The main advantages of using the blow-molding machine are directly related to the fact that the production is increased in an exponential way, without the need to use other blowing stations, and using almost the same physical space of a conventional similar machine.

8 Claims, 8 Drawing Sheets

BLOW-MOLDING MACHINE FOR THERMOPLASTIC PIECES AND CONTAINERS

FIELD OF THE INVENTION

The present invention relates to a blow-molding machine for thermoplastic pieces and containers, which is designed to work simultaneously with two or more molding lines.

The blow-molding machine for thermoplastic pieces and containers of the present invention is substantially more efficient than similar machines belonging to the known state of the art.

BACKGROUND OF THE INVENTION

Conventional thermoplastic extruders include machines that are fed with various types of granulated and solid thermoplastic materials.

These thermoplastic materials are heated and consequently melted. Then, they are pumped throughout the entire length of the pipe of said extruders, originating hollow, continuous and semi-solid filaments (molten material). The final shape and area sizes (height and width or diameter) of these filaments correspond to the shape and sizes of the extrusion head used in each extruder.

Conventional thermoplastic blowers comprise machines capable of expanding thermoplastic raw materials, providing them with a final shape pre-determined by the mold. Such raw materials are generally hollow and disposed within the water-cooled mold (said molds belong to the blowers in question), and then they are pressurized by compressed air flows. These flows cause the raw materials to expand equally and assume the shape identical to the shape of the mold cavities.

Bottles made of thermoplastic materials are generally produced by thermoplastic blowers.

The state of the art also comprises blower extruders, which are generally used in the manufacture of plastic bottles. A blower extruder, as its name suggests, combines a thermoplastic extruder with a thermoplastic blower, which will allow the extruded thermoplastic material to be directly blown.

A blower extruder, as described above, is in fact a blowing station coupled to an extrusion station. Conventionally, a blowing station includes components dimensioned to a single mold, that is, the current blowing stations belonging to the state of the art have only one outlet for molten thermoplastic material, and air outlets (perpendicular or transverse in relation to the inlet channel of thermoplastic molten materials) are consistent with the number of cavities existing in the molds. In short, each blowing station comprises only a single multiple cavity mold.

In addition to be an impeditive factor, it represents a major limitative factor, since it is necessary to install other blowing stations (if possible) when it is desirable to increase the production of a blower extruder. However, a blower extruder has a limited number of blowing stations (maximum two stations), and it occurs due to physical and mechanical factors.

Optionally, in order to achieve the desired increase in production, a second blower extruder is used. Such solution, which is financially expensive, demands physical space, and it is not always easily available in industries.

Therefore, from the aforementioned, it becomes obvious that is necessary to construct a blow-molding machine that solves the problems stated above, in an economic way, and without demanding excessive physical space.

BRIEF DESCRIPTION OF THE INVENTION

The present invention was developed in order to overcome the problems mentioned above, by providing a new blow-molding machine for thermoplastic pieces and containers designed to work simultaneously with two or more molding lines.

The blow-molding machine for thermoplastic pieces and containers, object of the present invention, is formed by an extrusion set and a blow-molding set, wherein said blow-molding set is designed to "blow" molten materials from the extrusion set, in two or more molding lines.

It should also mention that in addition to increasing productivity, the present blow-molding machine also allows a slight increase in the diversity of finished products, provided that they are made from the same material (type of thermoplastic material) with similar dimensions.

The present blow-molding machine is versatile, effective and practical, in addition to its numerous advantages.

The main advantages of using the blow-molding machine are directly related to the fact that the production is increased in an exponential way, without the need to use other blowing stations, and using almost the same physical space of a conventional similar machine.

It is also observed that this blow-molding machine provides a remarkable energy saving, since a double production is obtained with the same electric power consumption of a conventional blowing station.

BRIEF DESCRIPTION OF DRAWINGS

The present invention will now be described in detail with reference to the accompanying drawings, in which:

FIG. 1.1 is an enlarged detail view of an extrusion head coupled to a blowing station;

FIG. 1.2 is an enlarged detail view of an extrusion head coupled to two blowing stations;

FIG. 3.1 is a perspective view of a molding station;

FIG. 3.2 is a side view of a molding station;

FIG. 3.3 is a superior view of a molding station;

FIG. 4.1 is a perspective view of the blow-molding machine for thermoplastic pieces and containers, in accordance with the present invention;

FIG. 4.2 is a superior view of the blow-molding machine for thermoplastic pieces and containers, in accordance with the present invention;

FIG. 4.3 is a side view of the blow-molding machine for thermoplastic pieces and containers, in accordance with the present invention;

FIG. 5.1 is a detailed illustrative drawing which conceptually and schematically illustrates the first stage of the work performed by the blow-molding machine for thermoplastic pieces and containers, in accordance with the present invention, wherein said machine comprises two molding stations;

FIG. 5.2 illustrates, schematically and conceptually, the second stage of work performed by the blow-molding machine for thermoplastic pieces and containers, in accordance with the present invention, wherein said machine comprises two molding stations;

FIG. 5.3 illustrates, schematically and conceptually, the third stage of work performed by the blow-molding machine for thermoplastic pieces and containers, in accordance with the present invention, wherein said machine comprises two molding stations;

FIG. 5.4 illustrates, schematically and conceptually, the fourth stage of work performed by the blow-molding machine for thermoplastic pieces and containers, in accordance with the present invention, wherein said machine comprises two molding stations;

DETAILED DESCRIPTION OF THE INVENTION

Based on the figures above, the blow-molding machine for thermoplastic pieces and containers, hereinafter designated by the reference numeral (1), has an extrusion set (2) and a blow-molding set (3). It is also important to emphasize that the blow-molding set (3) is coupled to the extrusion set (2).

The extrusion set (2) is formed, preferably, by at least one conventional extrusion line, i.e., it comprises a main engine (2.1), a raw materials inlet (2.2), auxiliary cooling engines (2.3), a main duct (2.4), and a molten material outlet (2.5). It is also important to emphasize that the extrusion lines can be horizontal or vertical.

The blow-molding set (3) comprises an extrusion head (4) by at least one blowing station (5), and at least one molding station (6).

The extrusion head (4) comprises at least two drawing lines of thermoplastic material (4.1), wherein said drawing lines (4.1), regardless of its number, are connected internally. Each drawing line (4.1) has several drawing dies (4.2), wherein the number of said drawing dies (4.2) varies according to the needs of each model to be manufactured (blown). Each blowing station (5) comprises at least two blowing lines (5.1), which are interconnected with each other. Each blowing line (5.1) comprises a number of blowing nozzles (5.2), wherein the number of said blowing nozzles (5.2) is equal to the number of drawing dies (4.2) and, therefore, equal to the number of cavities existing in the molds used.

Each molding station (6) comprises at least two molding lines (6.1), wherein each molding line (6.1) allows the use of a mold (6.2) having several cavities (6.3). The number and dimensions of said cavities (6.3) vary with the needs of each product to be blown. It is also important to emphasize that each molding station (6) has a system that performs the synchronic and simultaneous opening and closing of the molding lines (6.1), wherein said system is, preferably, hydraulic.

Figure 11:
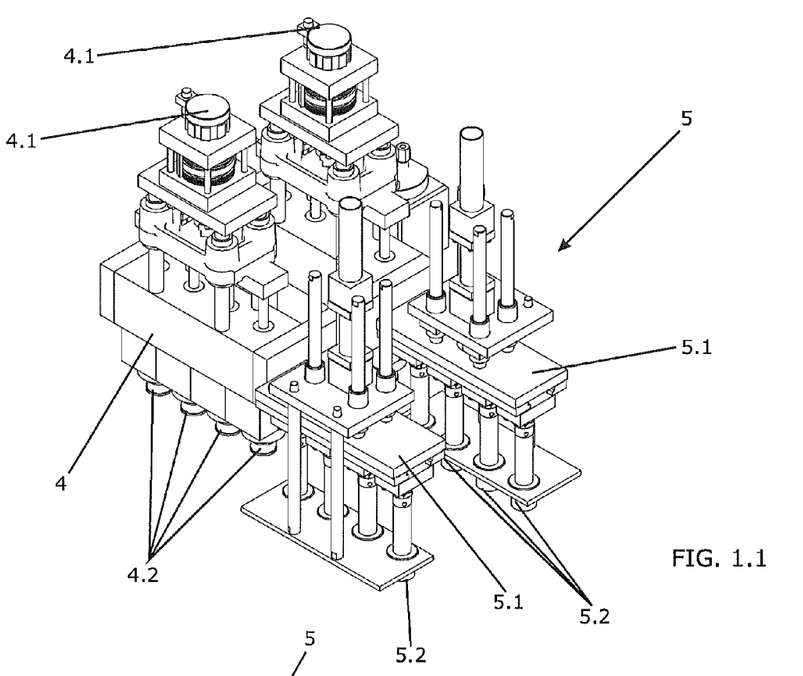
Figure 12:
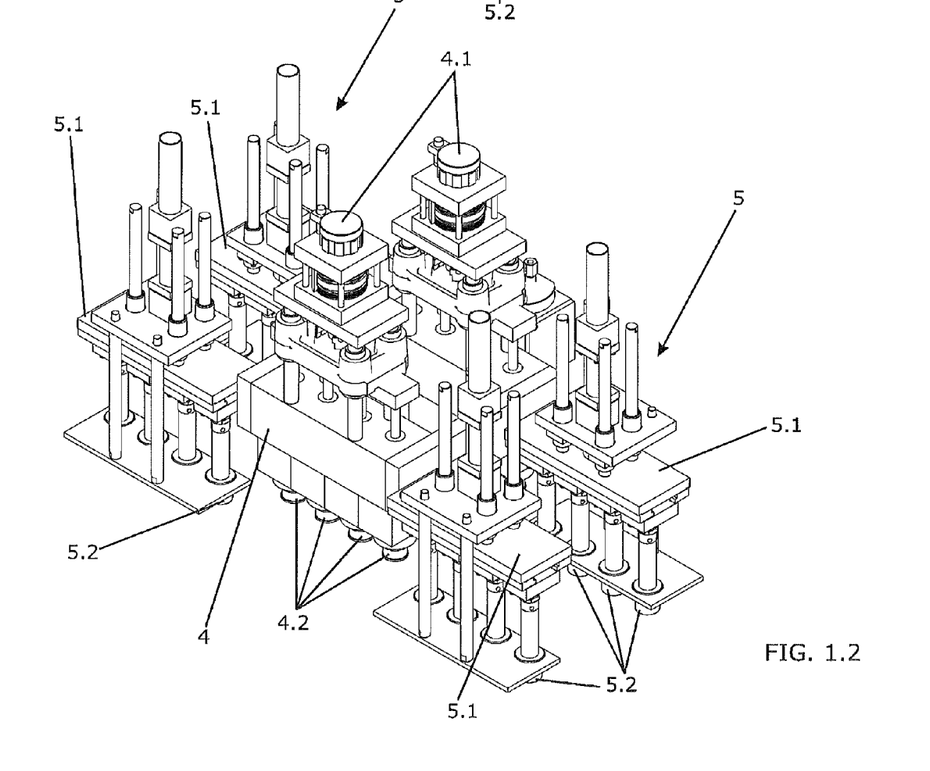

FIGS. 1.1 and 1.2 illustrate the arrangement of the extrusion head (4) and the blowing station (5). FIG. 1.1 illustrates an extrusion head (4) and a blowing station (5), wherein, in this case, said extrusion head (4) contains two drawing lines (4.1), and the blowing station (5) contains two blowing lines (5.2). Said blowing station (5) is arranged in one side of the extrusion head (4).

FIG. 1.2, which illustrates a more complete and optional version, shows two blowing stations (5), wherein each blowing station is arranged in one of the sides of an extrusion head (4). In this case, said extrusion head (4) has two drawing lines (4.1) and each blowing station has two blowing lines (5.1).

Figure 2:
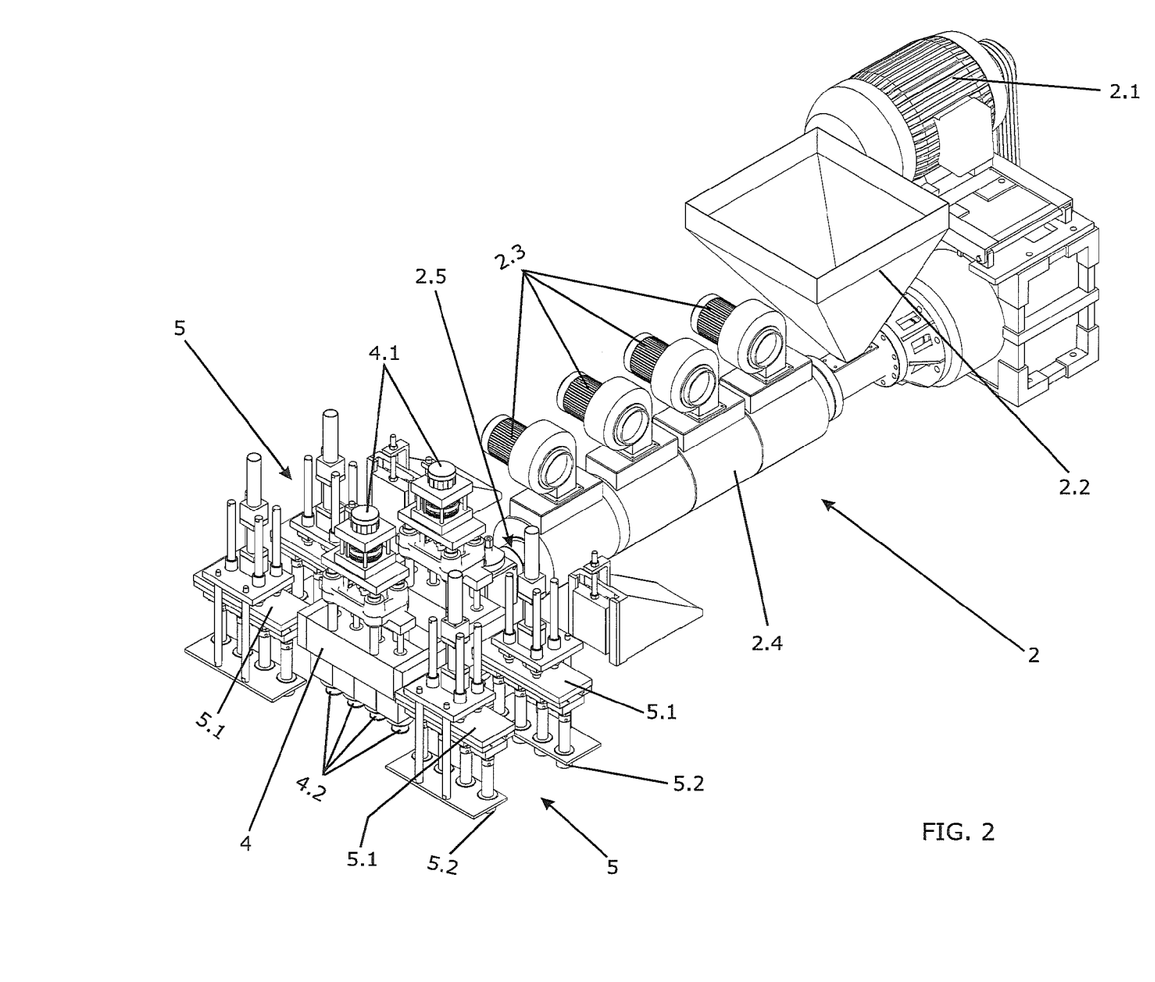
FIG. 2 is a conceptual and enlarged detail view of an extrusion line attached to an extrusion head, which is coupled to two blowing stations.

In a conceptual and detailed way, FIG. 2 illustrates the blow-molding machine for thermoplastic pieces and containers (1). In this Figure, there is a conventional extrusion line attached to an extrusion head (4), wherein two blowing stations (5) are also coupled to said extrusion head (4).

Figures 31, 32, 33:
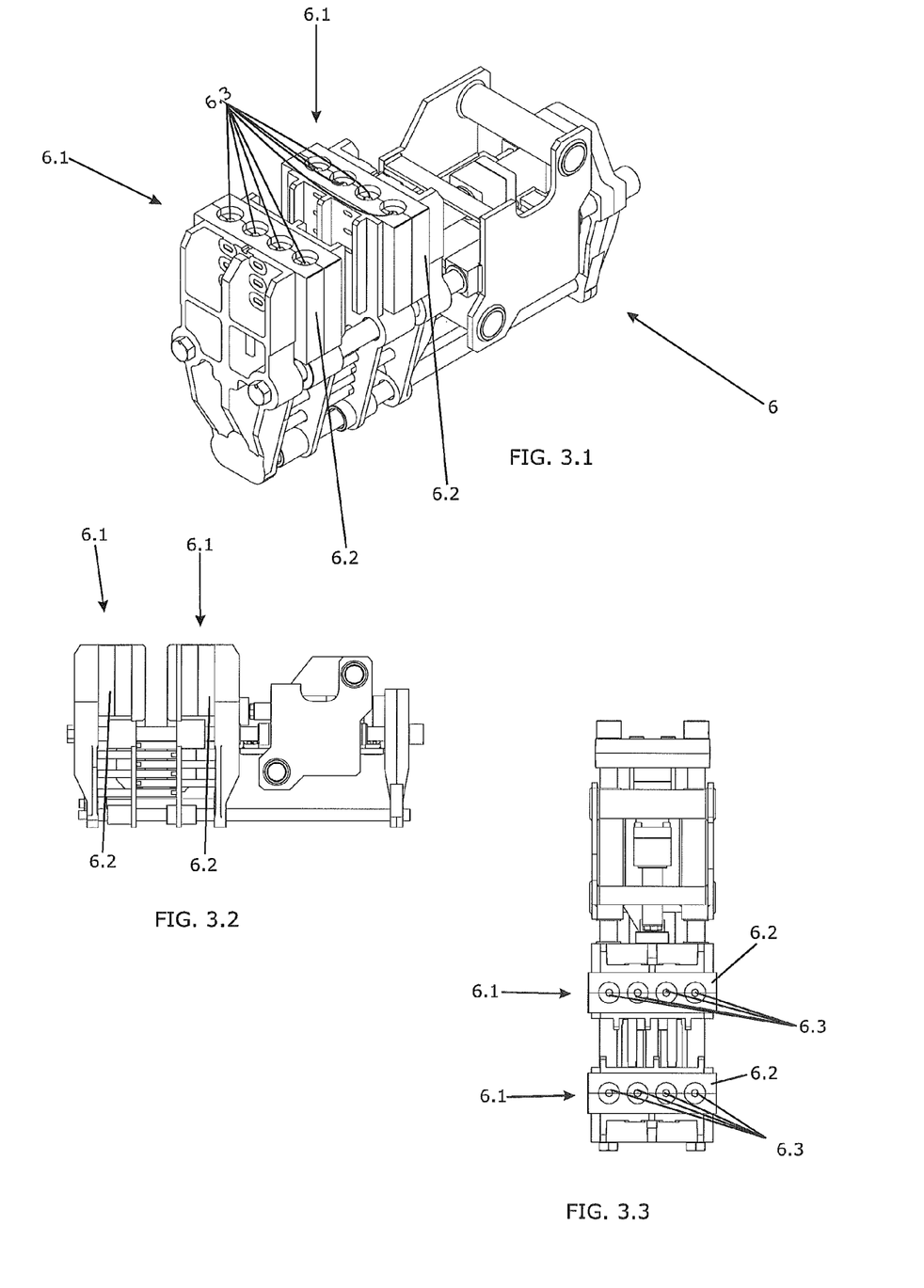
Figure 41:
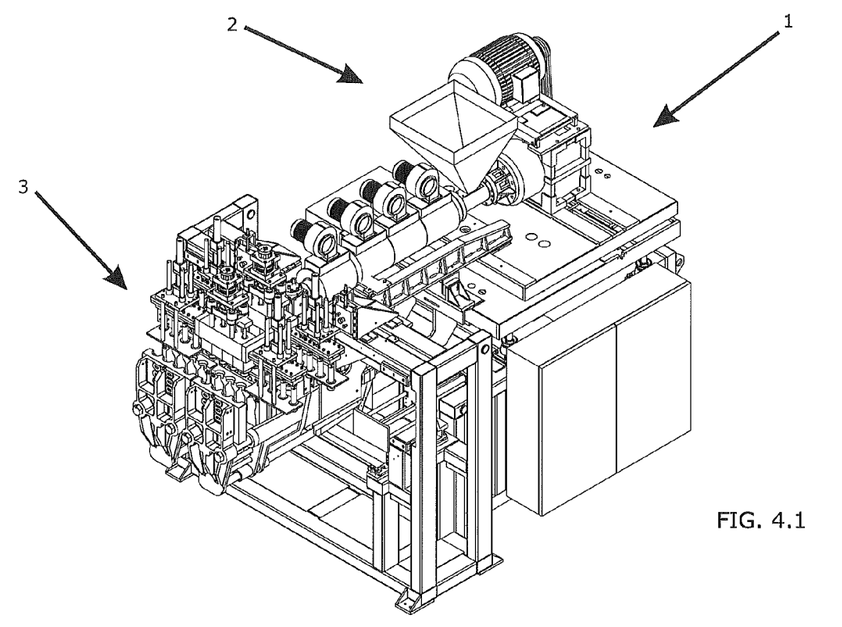
Figure 42:
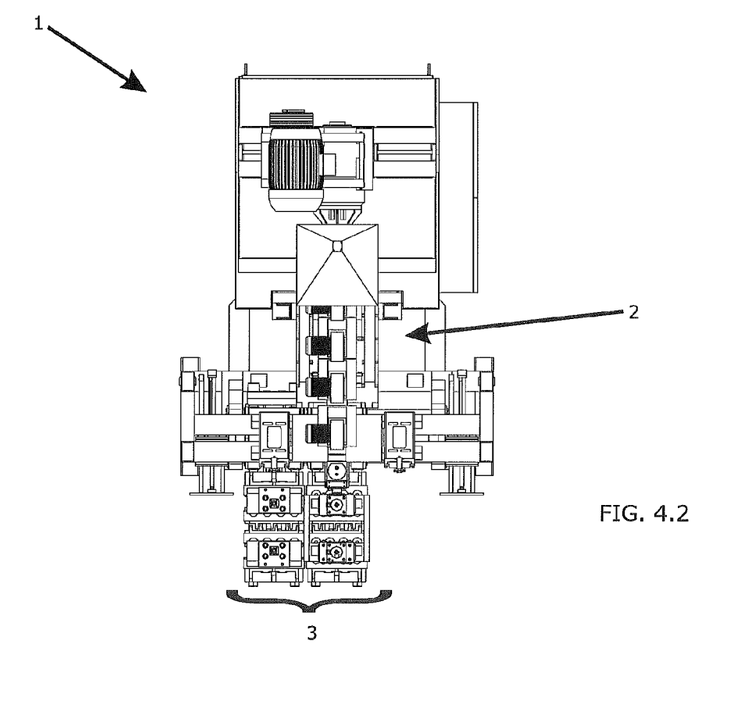
Figure 43:
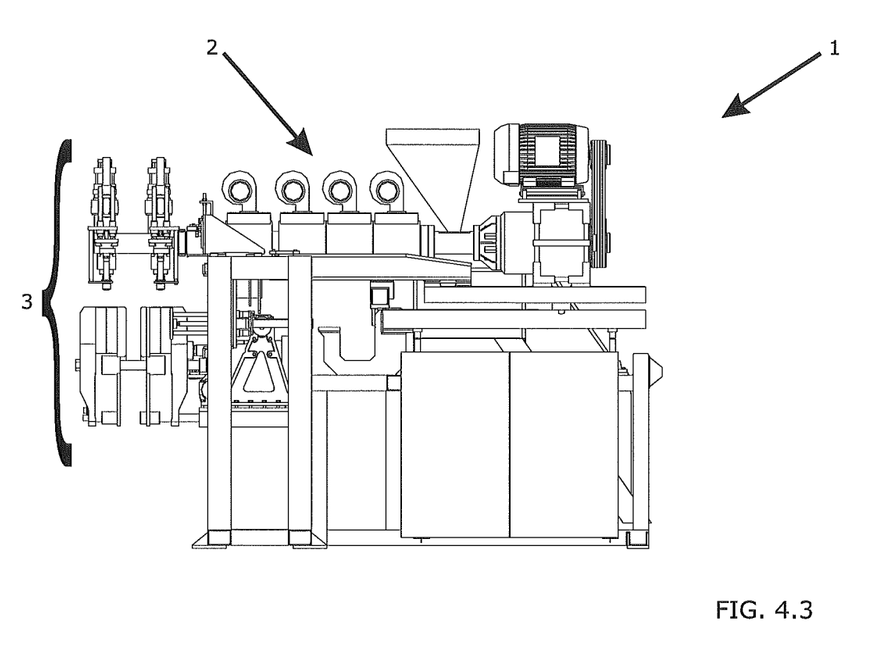
Figure 51:
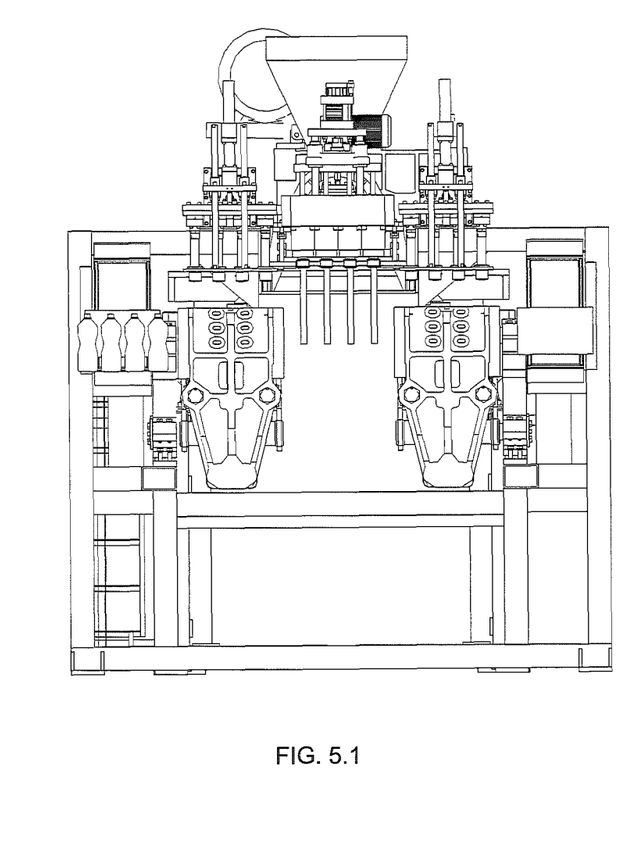
Figure 52:
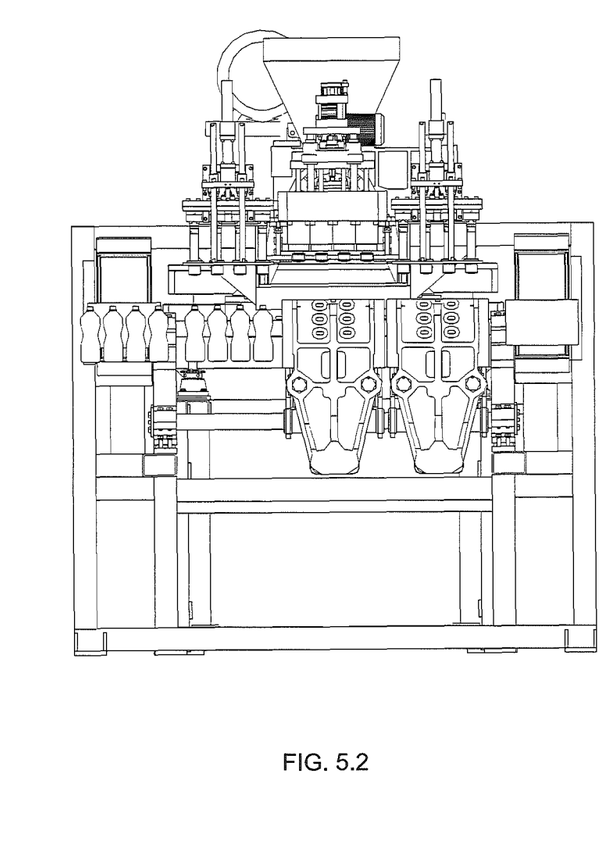
Figure 53:
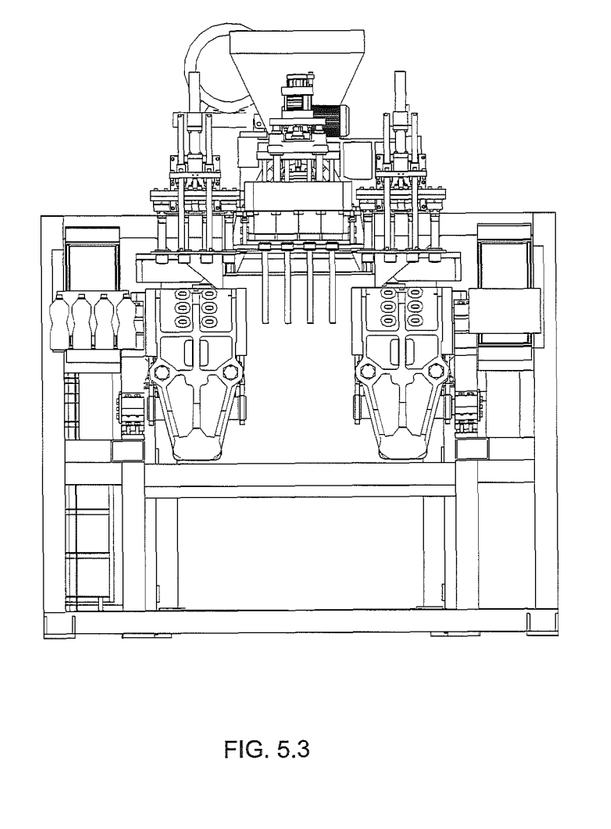
Figure 54:
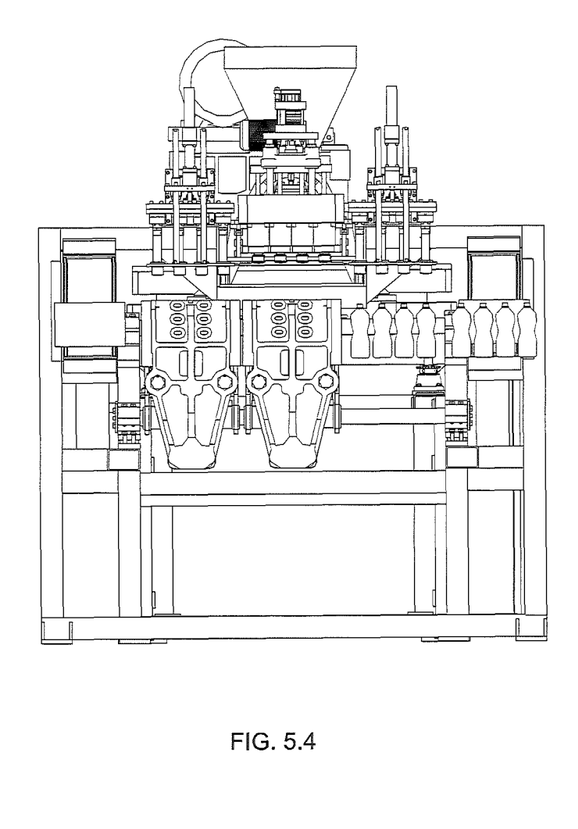

FIGS. 3.1, 3.2, and 3.3 are related to the molding station (6).

Since the constructivity of the blow-molding machine for thermoplastic pieces and containers (1) was described, it is easy to realize its operation and advantages.

Firstly, the granulated thermoplastic material is processed by the extruding station (2). This granulated thermoplastic material is molten and flows to the blow-molding set (3). This flow is constant while the blow-molding machine for thermoplastic pieces and containers of the present invention is running.

The molten material enters into the extrusion head (4), disseminates by drawing lines (4.1), and is expelled by drawing dies (4.2). The material expelled by said drawing dies (4.2) has a shape similar to a hose, that is, a non-rigid circular pipe.

While said material is expelled, the molding station (6) is arranged under the extrusion head (4), and wherein cavities (6.3) are aligned to the drawing dies (4.2). Thus, the thermoplastic material enters into the cavity (6.3) of each one of the molds (6.2) inserted into the molding lines (6.1).

After that, the molding station (6) moves horizontally and is positioned under a blowing station (5), wherein the cavities (6.3) already filled with thermoplastic material are aligned with the blowing nozzles (5.3). Then, the blowing occurs and, in this process, thermoplastic materials in each one of the cavities (6.3) assume the internal shape of said cavities (6.3).

Subsequently, the molds (6.2) are open, and the thermoplastic pieces and containers are removed by gravity force. Afterward, the molds (6.2) are closed and the process restarts.

It is important to emphasize that each blow-molding machine for thermoplastic pieces and containers (1) may contain up to two molding stations (6), wherein, during a production process, a molding station (6) receives the molten thermoplastic material while the other molding station (6) receives the blowing nozzles (5.3). Schematically, this process is best observed through FIGS. 5.1, 5.2, 5.3, and 5.4.

Although the concepts of extrusion and blowing are already widespread, the concept disclosed herein, i.e., a blow-molding process in two or more molding lines, simultaneously, in a single molding station, is only possible by the implementation of the blow-molding set (3) disclosed herein.

It is also important to emphasize that the number of molding lines depends solely on the number of drawing lines (4.1), blowing lines (5.1), and molding lines (6.1).

Based on the above context, it becomes easy to observe that the blow-molding machine for thermoplastic pieces and containers (1) presents many advantages over similar machines belonging to the known state of the art, because, as previously emphasized, a single blow-molding machine (1) is able to increase the production, in addition to allow a slight diversification of finished products, occupying the space conventionally used.

It is also important to emphasize that this blow-molding machine (1) comprises, optionally, a extrusion set (2) formed by more than one extrusion line, both vertical and horizontal, wherein all provided extrusion lines may be coupled to a single blow-molding station (3), or attached to various blow-molding stations (3).

Figure 6:
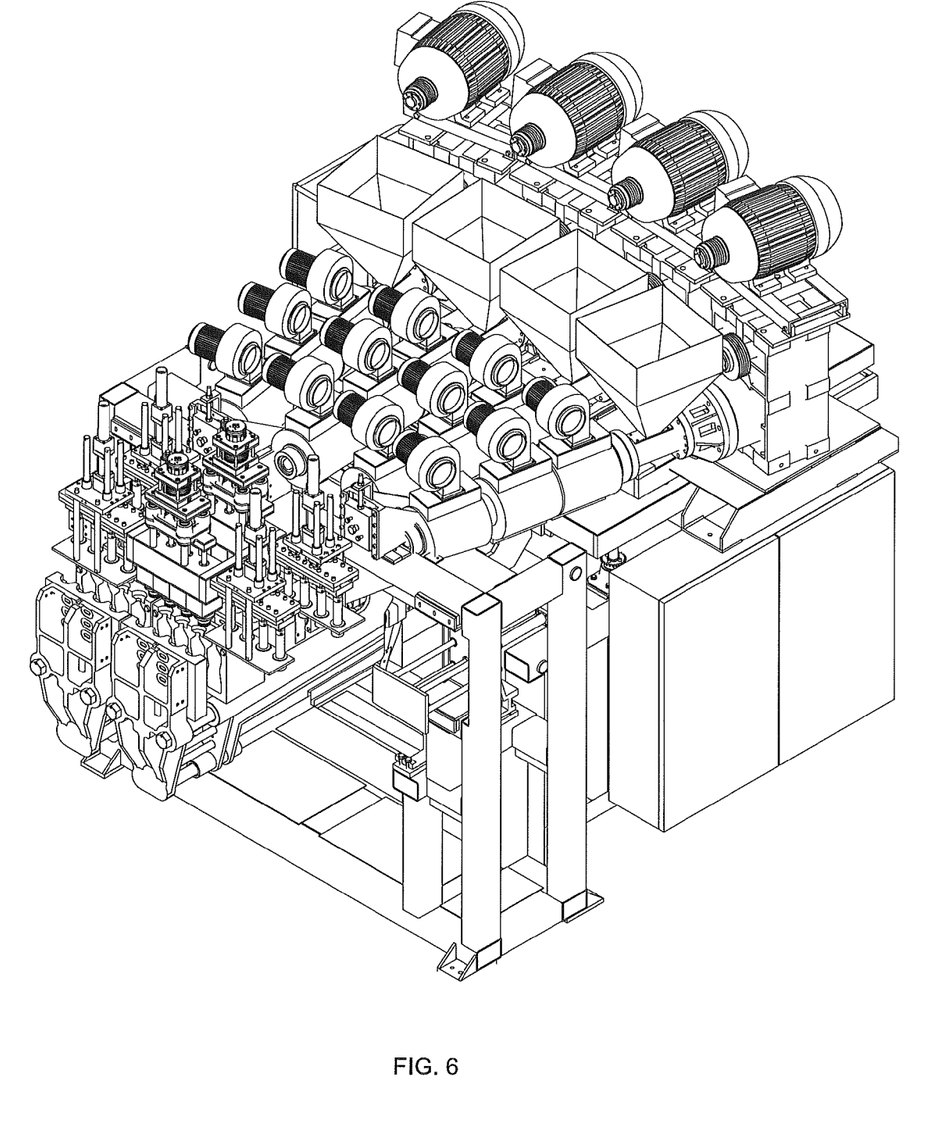
FIG. 6 illustrates an optional model of the blow-molding machine for thermoplastic pieces and containers, in accordance with the present invention, wherein said model consists of four extrusion lines.

This configuration is better interpreted by analysis of FIG. 6, where it is observed a blow-molding machine for thermoplastic pieces and containers (1) provide with four extrusion lines attached to a single extrusion head (4).

It should be observed that the figures described herein are intended to be illustrative of the devices and concepts herein disclosed, and are not intended to limit the scope of the present invention.

The invention claimed is:
1. A blow-molding machine for thermoplastic pieces and containers, the blow-molding machine comprising:

a plurality of extrusion sets, each extrusion set including an extrusion line, a main engine, a raw materials inlet, at least one auxiliary cooling engine, a main duct, and a molten material outlet; and a plurality of blow-molding sets coupled to the plurality of extrusion sets, each of the plurality of blow-molding sets including:

an extrusion head having at least two drawing lines of thermoplastic materials, a first blowing station arranged on a first side of the extrusion head, the first blowing station having at least two interconnected blowing lines and a first molding station having at least two molding lines, wherein each of the at least two molding lines of the first molding station allows a use of a first mold having a plurality of cavities, and a second blowing station arranged on a second side of the extrusion head, the second blowing station having at least two interconnected blowing lines and a second molding station having at least two molding lines, wherein each of the at least two molding lines of the second molding station allows a use of a second mold having a plurality of cavities;

wherein the plurality of extrusion sets coupled to the plurality of blow molding sets are arranged together side-by-side to form a single blow molding station.

2. The blow molding machine of claim 1, wherein the at least one conventional extrusion line is at least one of horizontal and vertical.

3. The blow-molding machine of claim 1, wherein the extrusion line is coupled to the first blowing station and the second blowing station.

4. The blow-molding machine of claim 1, wherein the at least two drawing lines of the extrusion head are connected internally and include a plurality of drawing dies.

5. The blow-molding machine of claim 4, wherein a number of the plurality of drawing dies varies according to the needs of each model to be manufactured.

6. The blow-molding machine of claim 1, wherein each of the at least two blowing lines of the first blowing station and each of the at least two blowing lines of the second blowing station include a number of blowing nozzles, the number of blowing nozzles being equal to the number of a plurality of drawing dies and the plurality of cavities of the first mold and the second mold.

7. The blow-molding machine of claim 1, wherein the first molding station and the second molding station have a system that performs a synchronic and simultaneous opening and closing of the at least two molding lines of the first and second molding stations.

8. The blow-molding machine of claim 7, wherein the system that performs the synchronic and simultaneous opening and closing of the at least two molding lines of the first and second molding stations is at least one of mechanical, hydraulic, pneumatic, and electric.

* * * * *